US008458785B2

(12) United States Patent
Lin et al.

(10) Patent No.: US 8,458,785 B2
(45) Date of Patent: Jun. 4, 2013

(54) INFORMATION SECURITY PROTECTION HOST

(75) Inventors: Chih-Hung Lin, Zhonghe (TW);
Chin-Wei Tien, Shulin (TW);
Sheng-Hao Wang, Luzhou (TW)

(73) Assignee: Institute for Information Industry, Taipei (TW)

( * ) Notice: Subject to any disclaimer, the term of this patent is extended or adjusted under 35 U.S.C. 154(b) by 299 days.

(21) Appl. No.: 12/960,056

(22) Filed: Dec. 3, 2010

(65) Prior Publication Data

US 2012/0117642 A1    May 10, 2012

(30) Foreign Application Priority Data

Nov. 9, 2010  (TW) .............................. 99138462 A

(51) Int. Cl.
*G06F 15/16*    (2006.01)
(52) U.S. Cl.
USPC .......................................................... 726/13
(58) Field of Classification Search
USPC ..................... 726/11–15, 22–25, 1
See application file for complete search history.

(56) References Cited

U.S. PATENT DOCUMENTS

| | | | |
|---|---|---|---|
| 7,496,961 B2 * | 2/2009 | Zimmer et al. ................. 726/23 |
| 2004/0015728 A1 * | 1/2004 | Cole et al. ..................... 713/201 |
| 2007/0033260 A1 | 2/2007 | Grouzdev et al. |
| 2007/0083924 A1 * | 4/2007 | Lu ................................... 726/13 |
| 2008/0148341 A1 * | 6/2008 | Ferguson et al. ................ 726/1 |
| 2009/0249438 A1 * | 10/2009 | Litvin et al. ...................... 726/1 |
| 2010/0064301 A1 | 3/2010 | Suzuki |

FOREIGN PATENT DOCUMENTS

| | | |
|---|---|---|
| JP | 2006-166062 | 6/2006 |
| JP | 2007-500381 | 1/2007 |
| JP | 2010-66931 | 3/2010 |
| WO | 2008/050651 A1 | 5/2008 |

OTHER PUBLICATIONS

Japanese Office Action of Application No. 2010-0273505 mailed Oct. 16, 2012.

* cited by examiner

*Primary Examiner* — Nirav B Patel
(74) *Attorney, Agent, or Firm* — Ping Wang; Andrews Kurth, LLP

(57) ABSTRACT

An information security protection host is provided. The information security protection host comprises a network interface and a virtual machine monitor (VMM) device. The network interface is connected to a computer network and is configured to receive a first packet. The VMM device is configured to run a first operating system, wherein the first operating system provides a first network service. The VMM device is further configured to provide a first operating system information of the first operating system and a first network service information of the first network service instantaneously so as to determine the security of the first packet.

20 Claims, 4 Drawing Sheets

INFORMATION SECURITY PROTECTION HOST

This application claims priority to Taiwan Patent Application No. 099138462 filed on Nov. 9, 2010, which is hereby incorporated by reference in its entirety.

BACKGROUND

1. Field

The present invention relates to an information security protection host. More particularly, the information security protection host of the present invention can, according to one or more operating systems running on itself and network services provided by the one or more operating systems, choose sets of verification rules, which correspond to different operating systems or network services provided by the operating systems, from a plurality of verification rules to verify a received packet. This can avoid that packets related to different operating systems are all verified by using identical verification rules.

2. Descriptions of the Related Art

Owing to rapid development of the Internet, more and more enterprises now provide various network services (e.g., Web page services, email services and File Transfer Protocol (FTP) services) through deployment of hosts. However, while the Internet provides convenience for people to transmit information, it also makes possibility for some people to intrude into the hosts to steal or tamper with data stored therein. Therefore, to protect data in the hosts, almost all the hosts have been installed with an intrusion detection system (IDS) to detect various intrusion events.

Conventional IDSs generally load too many verification rules into received packets in order to verify content of the packets, and even for packets without possibility of imposing a threat on operating systems running in the hosts, the conventional IDSs also loads all verification rules for verification. However, loading too many verification rules significantly compromises the system performances and tends to make a false determination.

Furthermore, currently for hosts of some enterprises, a virtual machine monitor (VMM) device is used to run a number of different operating systems. Hence, if the VMM device further runs a conventional IDS to verify each packet associated with these different operations systems, the problems of compromising system performances due to loading too many verification rules would necessarily become more serious.

According to the above descriptions, efforts still have to be made in the art to improve detection performance of an IDS, especially when a VMM device is used in a host to run a number of different operating systems.

SUMMARY

An objective of the present invention is to provide an information security protection host. The information security protection host runs one or more operating systems to provide one or more network services. The information security protection host determines security of received packets associated with different operating systems according to the running operating systems and the services provided by the running operating systems.

To achieve the aforesaid objective, the present invention discloses an information security protection host, which comprises a network interface and a virtual machine monitor (VMM) device. The network interface connects to a computer network and is configured to receive a first packet. The VMM device connects to the network interface and is configured to run a first operating system. The first operating system provides a first network service, and the VMM device is further configured to provide in real time a piece of first operating system information of the first operating system and a piece of first network service information of the first network service. The first network service information comprises a first service port number, and when the first packet is received by the network interface via a port, the VMM device further, according to the first operating system information and the first network service information, determines that the first packet is associated with the first operating system and a port number of the port is unequal to the first service port number so as to filter out the first packet.

Another objective of the present invention is to provide an information security protection host. The information security protection host runs one or more operating systems to provide one or more network services. The information security protection host further runs a security system that provides a plurality of verification rules. The security system chooses sets of verification rules, which are respectively applicable to different operating systems, from the verification rules according to the operating systems running on the information security protection host and the network services provided by the operating systems. Thus, when the information security protection host receives a packet associated with one of the operating systems, the security system applies the chosen set of verification rules corresponding to the operating system to verify content of the packet. This can avoid use of all the verification rules to verify the packet, thereby improving the detection performance.

To achieve the aforesaid objective, the present invention further discloses an information security protection host, which comprises a network interface and a VMM device. The network interface connects to a computer network and is configured to receive a first packet. The VMM device connects to the network interface and is configured to run a first operating system and a security system. The first operating system provides a first network service. The security system is configured to provide a plurality of verification rules. The VMM device further provides a piece of first operating system information of the first operating system and a piece of first network service information of the first network service to the security system in real time so that the security system, according to the first operating system information and the first network service information, chooses a first set of verification rules from the verification rules and determines that the first packet is associated with the first operating system so as to apply the first set of verification rules to verify the first packet.

Another objective of the present invention is to provide an information security protection host. The information security protection host runs one or more operating systems to provide one or more network services. The information security protection host further runs a security system that provides a plurality of verification rules, and verifies received packets that are associated with the respective operating systems according to the verification rules. When a packet fails to pass one of the verification rules, the information security protection host further determines whether the packet is associated with one of the operating systems and whether the rule is associated with the operating system so as to decide whether the packet may impose a threat on the operating system. Thus, through the aforesaid mechanism, occurrence of a false determination can be prevented when the security system is used to verify the packet according to the verification rules.

To achieve the aforesaid objective, the present invention further discloses an information security protection host, which comprises a network interface and a VMM device. The network interface connects to a computer network and is configured to receive a first packet. The VMM device connects to the network interface and is configured to run a first operating system and a security system. The first operating system provides a first network service. The VMM device is further configured to provide in real time a piece of first operating system information of the first operating system and a piece of first network service information of the first network service. The security system is configured to provide a plurality of verification rules to verify the first packet according to the verification rules. When the first packet fails to pass one of the verification rules, the VMM device further, according to the first operating system information or the first network service information, determines that the first packet is associated with the first operating system and the rule is not associated with the first operating system, so as to prevent occurrence of a false determination when the security system is used to verify the first packet according to the verification rules.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides an information security protection host. The information security protection host of the present invention runs one or more operating systems, each of which provides one or more network services. When receiving a packet associated with one of the operating systems, the information security protection host determines security of the packet according to a piece of operating system information of the operating system and a piece of network service information of the network services provided by the operating system. Herein below, description of these embodiments is only intended to illustrate technical disclosures of the present invention rather than to limit scope of the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
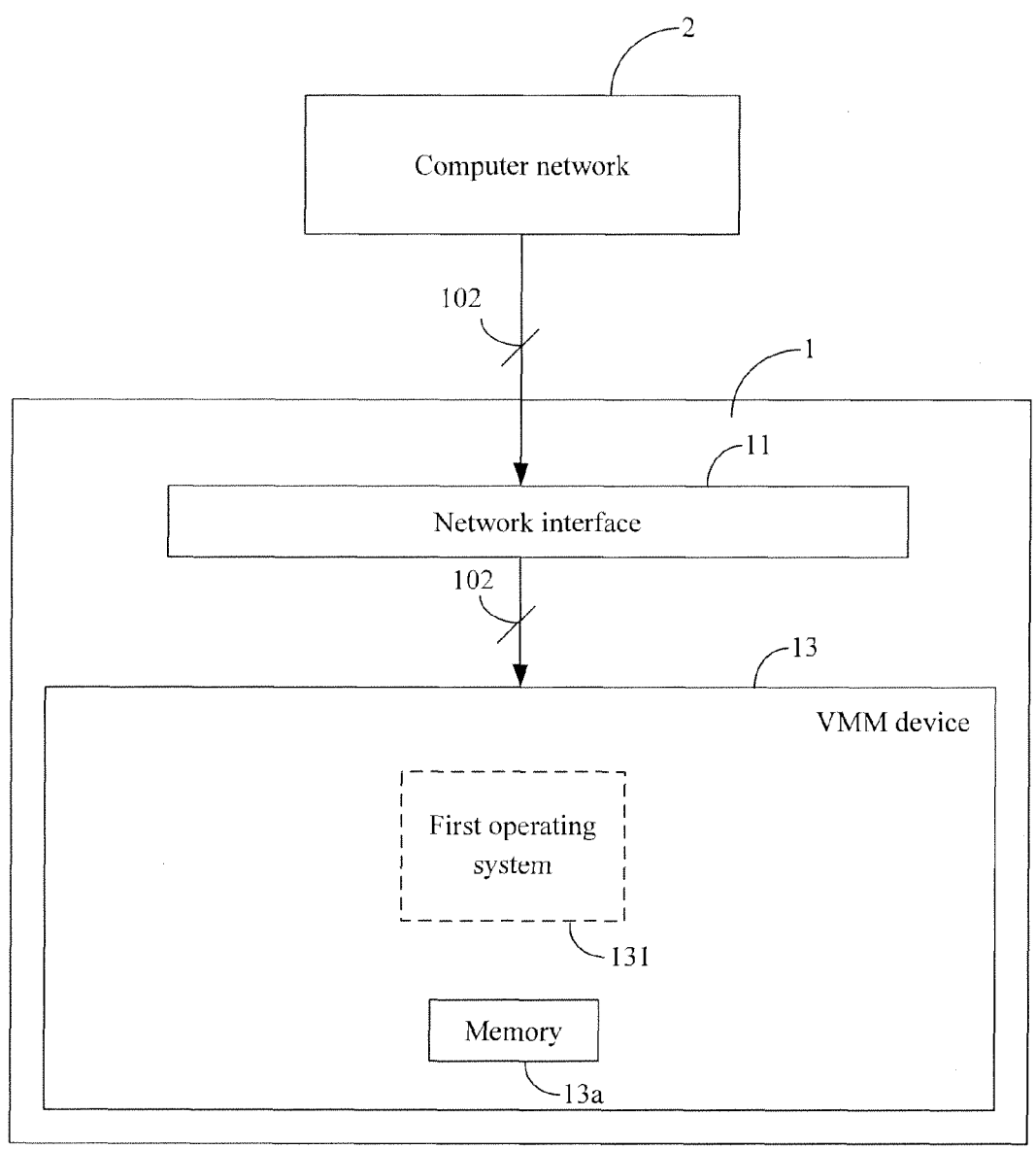
FIG. 1 is a schematic view of an information security protection host 1 in accordance with a first embodiment of the present invention.

An information security protection host 1 in accordance with a first embodiment of the present invention is shown in FIG. 1. The information security protection host 1 comprises a network interface 11 and a virtual machine monitor (VMM) device 13. The information security protection host 1 connects to a computer network 2 in a wired or wireless way via the network interface 11. The computer network 2 may be any of a private network, a public network, an Internet, any other kind of network or a combination thereof.

The VMM device 13 comprises a memory 13a and is configured to run a first operating system 131. The first operating system 131 provides a first network service, for example, a Web page service, a File Transfer Protocol (FTP) service, an email service, any other network service, or a combination thereof. It shall be appreciated that, the first operating system 131 may be an Microsoft operating system, a Unix-like operating system or any other operating system capable of providing a network service; and the VMM device 13 may be composed of common computer host hardware (e.g., comprising a central processing unit (CPU), a memory, a hard disc, a main board or the like), or any other device capable of running one or more operating systems simultaneously.

In this embodiment, when the VMM device 13 is running the first operating system 131, because running of the first operating system 131 necessitates use of the memory 13a, the memory 13a will have information related to the first operating system 131 stored therein, for example, a piece of first operating system information of the first operating system 131 and a piece of first network service information of the first network service provided by the first operating system 131. The first operating system information may be used to indicate that the first operating system is an Microsoft operating system, a Unix-like operating system or any other operating system, and the first network service information may be used to indicate that the first network service may include a Web page service, an FTP service, an email service, any other network service or a combination thereof.

Taking a Microsoft operating system as an example, when the Microsoft operating system is running, a kernel thereof establishes a process environment block (PEB) data structure that is stored in the memory for storing related parameters. An OSMajorVersion field and an OSMinorVersion field of the PEB data structure are used to store a version parameter of the Microsoft operating system. For instance, if the OSMajorVersion field has a value of "7" and the OSMinorVersion field has a value of "0", it represents that the Microsoft operating system is Windows 7; if the OSMajorVersion field has a value of "6" and the OSMinorVersion field has a value of "0", it represents that the Microsoft operating system is Windows Vista or Server 2008; if the OSMajorVersion field has a value of "5" and the OSMinorVersion field has a value of "2", it represents that the Microsoft operating system is Windows Server 2003; and if the OSMajorVersion field has a value of "5" and the OSMinorVersion field has a value of "1", it represents that the Microsoft operating system is Windows XP. As the PEB data structure is of a conventional technology and detailed content of the PEB data structure can be readily known by those of ordinary skill in the art according to existing technical documents, no further description will be made herein.

Besides, when the Microsoft operating system is running, the kernel thereof also establishes an EPROCESS data structure and an MIB_TCPROW_OWNER_MODULE data structure and stores these two data structures in the memory. The EPROCESS data structure records processes currently under execution (i.e., it comprises processes used to provide the first network service), and the MIB_TCPROW_OWNER_MODULE data structure records information related to the processes currently under execution. Accordingly, a process list can be obtained from the EPROCESS data structure, and then according to process identifications (PIDs) in the process list, information related to the processes currently under execution can be obtained from the MIB_TCPROW_OWNER_MODULE data structure. Additionally, when the first operating system 131 updates the first network service that it provides (i.e., sets up a new network service or closes up an existing network service), the first operating system 131 will generate a Page Fault message so that, according to the Page Fault message, the VMM device 13 can acquire a message related to setting up of the new network service or closing up of the existing network service so as to update the first network service information.

According to the example described above, the VMM device 13 reads from the memory 13a thereof the first operating system information of the first operating system 131 and the first network service information of the first network service provided by the first operating system 131. It shall be appreciated that, although only the Microsoft operating system is described herein as an example, those of ordinary skill in the art may, according to specifications of different operating systems, readily know how to acquire from the memory the operating system information and the network service information of the network service; therefore, the kinds of both the operating system and the network service that it provides are not intended to limit scope of the present invention, and no further description will be made on operations of other operating systems.

Next, when a first packet 102 is received by the network interface 11, the VMM device 13 may filter the first packet 102 according to a first service port number (e.g., 807) used by the first network service recorded in the first network service information. For instance, when the first packet 102 is received by the network interface 11 via a port (e.g., 544), the VMM device 13 may filter out the first packet 102 based on a determination that the first packet 102 is associated with the first operating system 131 (i.e., the first packet 102 is destined to the first operating system 131) and that the port number where the first packet 102 is received is unequal to the first service port number.

Figure 2:
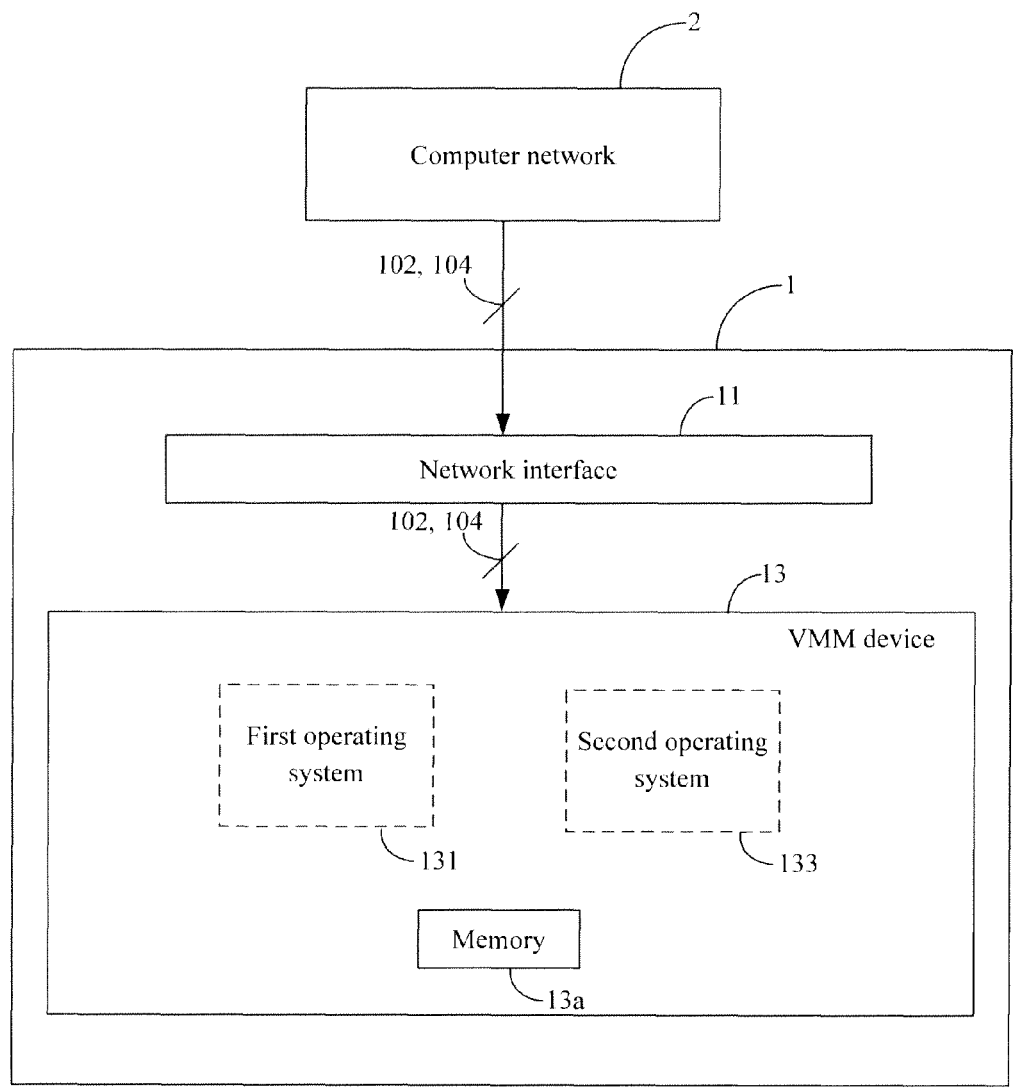
FIG. 2 is a schematic view of the information security protection host 1 in accordance with a second embodiment of the present invention.

The information security protection host 1 in accordance with a second embodiment of the present invention is shown in FIG. 2. Different from the first embodiment, in the second embodiment, the network interface 11 further receives a second packet 104 from the computer network 2, and the VMM device 13 of the information security protection host 1 is further configured to run a second operating system 133. The second operating system 133 also provides a second network service, for example, a Web page service, an FTP service, an email service, any other network service, or a combination thereof. Similarly, the second operating system 133 may be an Microsoft operating system, a Unix-like operating system or any other operating system capable of providing a network service.

When the VMM device 13 is running the second operating system 133, because running of the second operating system 133 also necessitates use of the memory 13a, the memory 13a will have information related to the second operating system 133 stored therein, for example, a piece of second operating system information of the second operating system 133 and a piece of second network service information of the second network service provided by the second operating system 133. The second operating system information 114 may be used to indicate that the second operating system 133 is a Microsoft operating system, a Unix-like operating system or any other operating system, and the second network service information may be used to indicate that the second network service may include a Web page service, an FTP service, an email service, any other network service or a combination thereof.

When the second packet 104 is received by the network interface 11, the VMM device 13 may filter the second packet 104 according to a second service port number (e.g., 707) used by the second network service recorded in the second network service information. For instance, when the second packet 104 is received by the network interface 11 via a port (e.g., 474), the VMM device 13 may filter out the second packet 104 based on a determination that the second packet 104 is associated with the second operating system 133 (i.e., the second packet 104 is destined to the second operating system 133) and that the port number where the second packet 104 is received is unequal to the second service port number.

Figure 3:
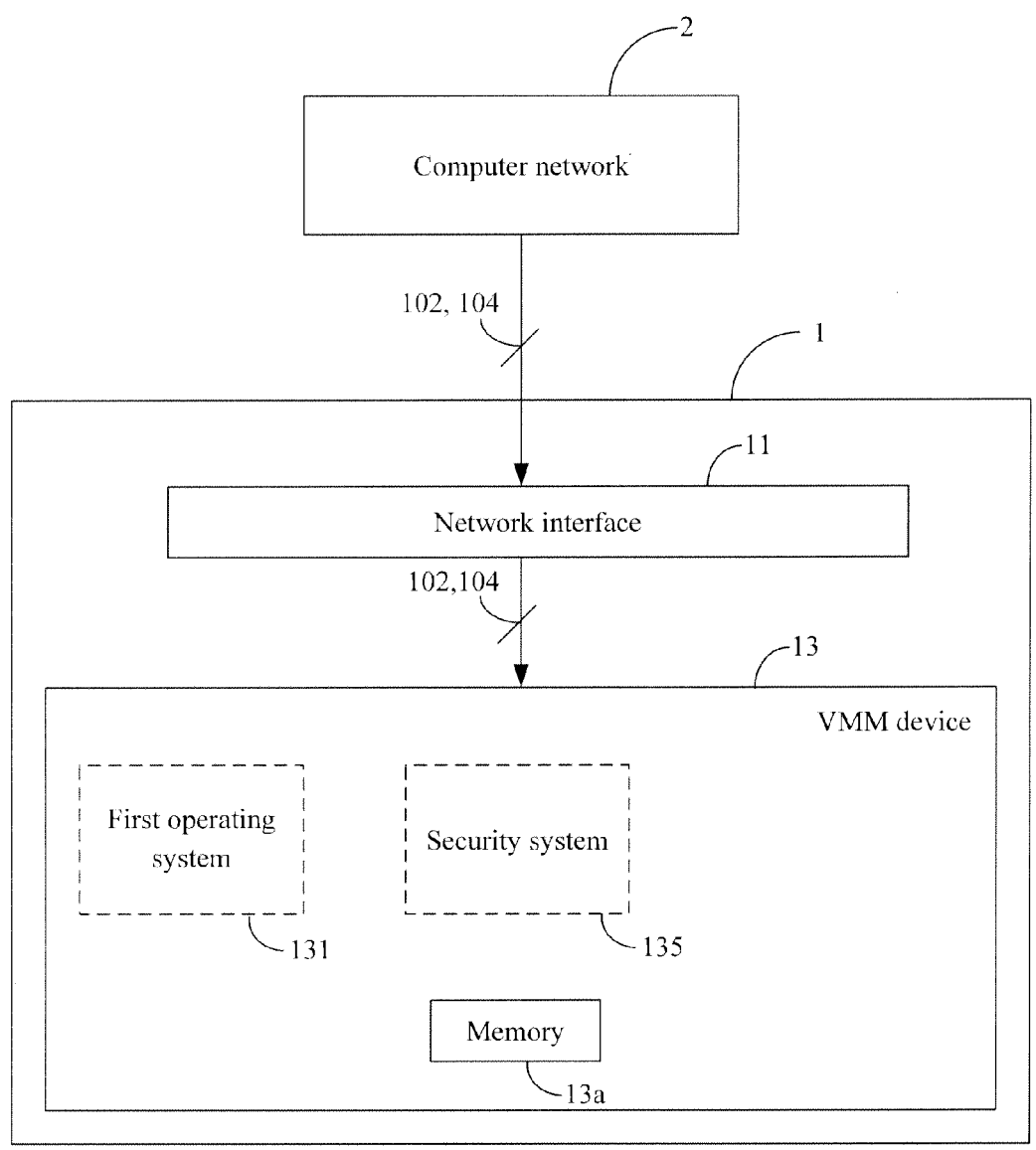
FIG. 3 is a schematic view of the information security protection host 1 in accordance with a third embodiment and a fifth embodiment of the present invention.

The information security protection host 1 in accordance with a third embodiment of the present invention is shown in FIG. 3. Different from the first embodiment, in the third embodiment, the VMM device 13 of the information security protection host 1 is further configured to run a security system 135, and there is no need for the VMM device 13 to filter the first packet 102 according to the first service port number used by the first network service recorded in the first network service information. The security system 135 is configured to provide a plurality of verification rules. The security system 135 may be an intrusion detection system (IDS), a network intrusion detection system (NIDS), a network intrusion prevention system (NIPS), a Web App firewall, a firewall or any other system capable of providing protection.

The VMM device 13 reads from the memory 13a thereof the first operating system information of the first operating system 131 and the first network service information of the first network service provided by the first operating system 131 and provides them to the security system 135. The security system 135 chooses a first set of verification rules from the verification rules according to the first operating system information or the first network service information. For example, when the first operating system information indicates that the first operating system is an Microsoft operating system (Windows Server 2003) and the first network service information indicates that the first network service comprises the email service, the security system 135 chooses from the verification rules those associated with the Microsoft operating system (Windows Server 2003) and further associated with the email service as the first set of verification rules.

Accordingly, when the first packet 102 is received from the network interface 11, the VMM device 13 firstly verifies the first packet 102 by using the security system 135. When the security system 135 determines that the first packet 102 is associated with the first operating system 131 (i.e., the first packet 102 is destined to the first operating system 131), the first set of verification rules, instead of all the verification rules, will be applied to verify the first packet 102. Specifically, if the first packet 102 passes the verification carried out using the first set of verification rules, then the first packet 102 is provided by the VMM device 13 for use in the first operating system 131; on the other hand, if the first packet 102 fails to pass the verification carried out using the first set of verification rules, then the first packet 102 is filtered out to prevent the first packet 102 from imposing a threat on the first operating system 131.

Furthermore, in other embodiments, the VMM device 13 may also firstly filter the first packet 102 according to the first service port number used by the first network service recorded in the first network service information. When the VMM device 13 determines that the first packet 102 is associated with the first operating system 131 (i.e., the first packet 102 is destined to the first operating system 131) and that the port number where the first packet 102 is received is equal to the first service port number, the VMM device 13 then verifies the first packet 102 by using the security system 135. In other words, the VMM device 13 of the present invention may verify the packet by merely using the security system 135, or filter the packet according to the port number before validating the packet by using the security system 135.

Figure 4:
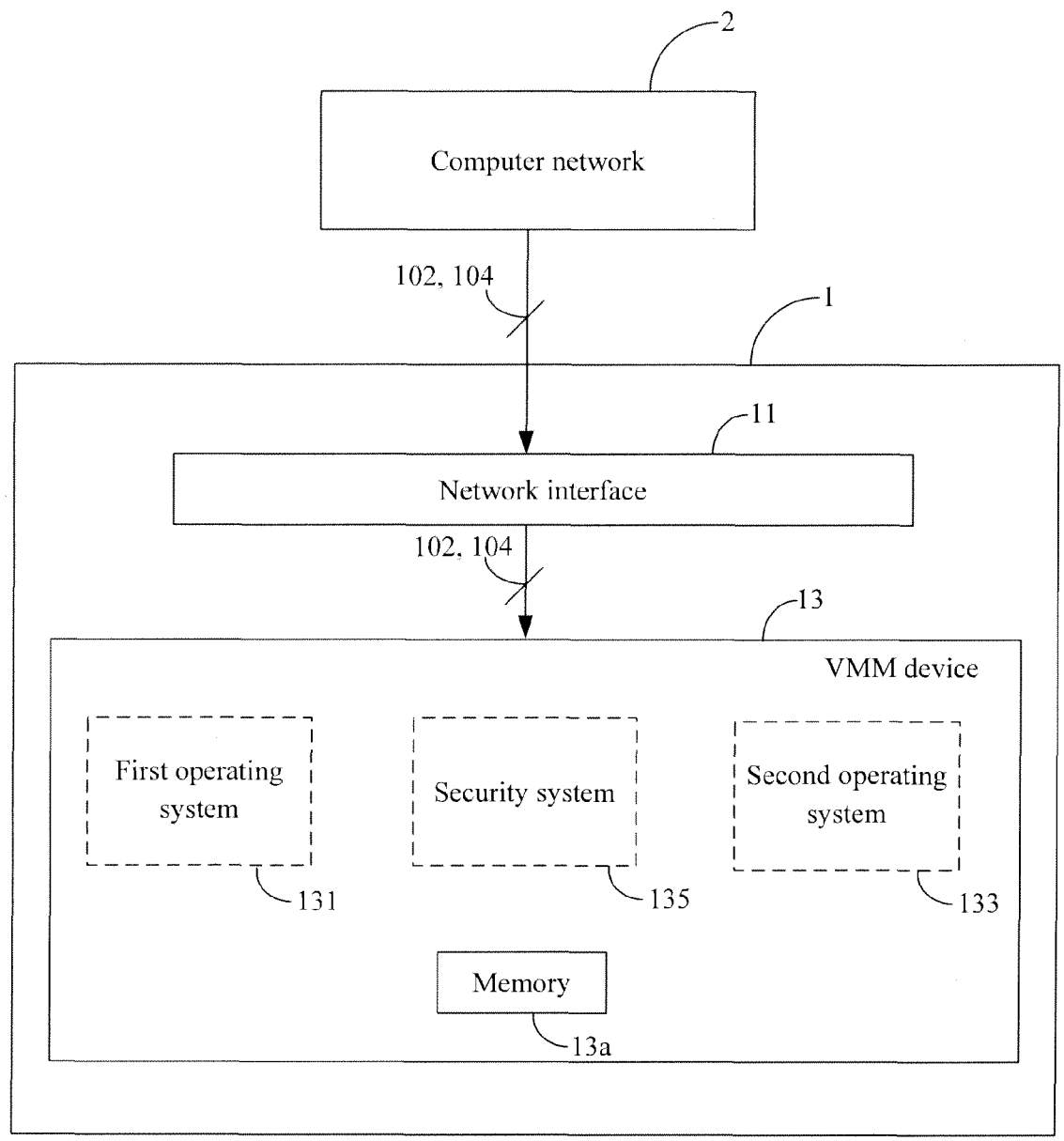
FIG. 4 is a schematic view of the information security protection host 1 in accordance with a fourth embodiment and a sixth embodiment of the present invention.

The information security protection host 1 in accordance with a fourth embodiment of the present invention is shown in FIG. 4. Different from the third embodiment, in the fourth embodiment, the network interface 11 further receives the second packet 104 from the computer network 2, and the VMM device 13 of the information security protection host 1 is further configured to run the second operating system 133. The second operating system 133 also provides a second network service, for example, a Web page service, an FTP service, an email service, any other network service, or a combination thereof. Similarly, the second operating system 133 may be an Microsoft operating system, a Unix-like operating system or any other operating system capable of providing a network service. In the fourth embodiment, there is also no need for the VMM device 13 to filter the second packet 104 according to the second service port number used by the second network service recorded in the second network service information.

When the VMM device 13 is running the second operating system 133, because running of the second operating system 133 also necessitates use of the memory 13a, the memory 13a will have information related to the second operating system 133 stored therein, for example, a piece of second operating system information of the second operating system 133 and a piece of second network service information of the second network service provided by the second operating system 133. The second operating system information may be used to indicate that the second operating system 133 is a Microsoft operating system, a Unix-like operating system or any other operating system, and the second network service information may be used to indicate that the second network service may include a Web page service, an FTP service, an email service, any other network service or a combination thereof.

The VMM device 13 reads from the memory 13a thereof the second operating system information of the second operating system 133 and the second network service information of the second network service provided by the second operating system 133 and provides them to the security system 135. The security system 135 chooses a second set of verification rules from the verification rules according to the second operating system information or the second network service information. For example, when the second operating system information indicates that the second operating system is a Unix-like operating system and the second network service information indicates that the second network service comprises the Web page service and the FTP service, the security system 135 chooses from the verification rules those associated with the Unix-like operating system and further associated with the Web page service and the FTP service as the second set of verification rules.

Accordingly, when the second packet 104 is received by the network interface 11, the VMM device 13 verifies the second packet 104 by using the security system 135. When the security system 135 determines that the second packet 104 is associated with the second operating system 133 (i.e., the second packet 104 is destined to the second operating system 133), the second set of verification rules, instead of all the verification rules, will be applied to verify the second packet 104. Specifically, if the second packet 104 passes the verification carried out using the second set of verification rules, then the second packet 104 is provided by the VMM device 13 for use in the second operating system 133; on the other hand, if the second packet 104 fails to pass the verification carried out using the second set of verification rules, then the second packet 104 is filtered out to prevent the second packet 104 from imposing a threat on the second operating system 133.

Furthermore, in other embodiments, the VMM device 13 may also firstly filter the second packet 104 according to the second service port number used by the second network service recorded in the second network service information. When the VMM device 13 determines that the second packet 104 is associated with the second operating system 133 (i.e., the second packet 104 is destined to the second operating system 133) and that the port number where the second packet 104 is received is equal to the second service port number, the VMM device 13 then verifies the second packet 104 by using the security system 135.

The information security protection host 1 in accordance with a fifth embodiment of the present invention is shown in FIG. 3. Different from the first embodiment, in the fifth embodiment, the VMM device 13 of the information security protection host 1 is further configured to run a security system 135. The security system 135 is configured to provide a plurality of verification rules. The security system 135 may be an IDS, an NIDS, an NIPS, a Web App firewall, a firewall or any other system capable of providing protection.

After the first packet 102 is received, the VMM device 13 verifies the first packet 102 by using the security system 135. The security system 135 applies all the verification rules to verify the first packet 102. When the first packet 102 fails to pass one of the verification rules, the VMM device 13 further, according to the first operating system information or the first network service information, determines that the first packet 102 is associated with the first operating system 131 and the rule is not associated with the first operating system 131 so as to decide whether a false determination occurs when the security system 135 applies all the verification rules to verify the first packet 102. Specifically, if the security system 135 determines that the first packet 102 does not comply with the rule of the verification rules, an alarm is issued by the security system 135.

n response to the alarm, the VMM device 13 determines that the packet is associated with the first operating system 131 (i.e., the first packet 102 is destined to the first operating system 131) and the rule is not associated with the first operating system 131; for example, when the first operating system 131 is a Windows Server 2003 operating system but the rule is inapplicable to the Windows Server 2003 operating system. Thus, the VMM device 13 can determine that the verification performed by the security system 135 on the first packet 102 is a false determination. In this way, a false determination can be prevented from occurring when the security system 135 applies all the verification rules to verify the first packet 102.

The information security protection host 1 in accordance with a sixth embodiment of the present invention is also shown in FIG. 4. Different from the fifth embodiment, in the sixth embodiment, the network interface 11 further receives the second packet 104 from the computer network 2, and the VMM device 13 of the information security protection host 1 is further configured to run the second operating system 133. The second operating system 133 also provides a second network service, for example, a Web page service, an FTP service, an email service, any other network service, or a combination thereof. Similarly, the second operating system 133 may be an Microsoft operating system, a Unix-like operating system or any other operating system capable of providing a network service.

When the VMM device 13 is running the second operating system 133, because running of the second operating system 133 also necessitates use of the memory 13*a*, the memory 13*a* will have information related to the second operating system 133 stored therein, for example, a piece of second operating system information of the second operating system 133 and a piece of second network service information of the second network service provided by the second operating system 133. The second operating system information may be used to indicate that the second operating system 133 is an Microsoft operating system, a Unix-like operating system or any other operating system, and the second network service information may be used to indicate that the second network service may include a Web page service, an FTP service, an email service, any other network service or a combination thereof.

After the second packet 104 is received, the VMM device 13 verifies the second packet 104 by using the security system 135. The security system 135 applies all the verification rules to verify the second packet 104. When the second packet 104 fails to pass one of the verification rules, the VMM device 13 further, according to the second operating system information or the second network service information, determines that the second packet 104 is associated with the second operating system 133 and the rule is not associated with the second operating system 133 so as to decide that a false determination occurs when the security system 135 applies all the verification rules to verify the second packet 104. Specifically, if the security system 135 determines that the second packet 104 does not comply with the rule of the verification rules, then an alarm is issued by the security system 135. In response to the alarm, the VMM device 13 determines that the packet is associated with the second operating system 133 (i.e., the second packet 104 is destined to the second operating system 133) and the rule is not associated with the second operating system 133; for example, when the second operating system 133 is a Unix-like operating system but the rule is inapplicable to the Unix-like operating system. Thus, the VMM device 13 can determine that the verification performed by the security system 135 on the second packet 104 is a false determination. In this way, a false determination can be prevented from occurring when the security system 135 applies all the verification rules to verify the second packet 104.

It shall be particularly appreciated herein that, "the first" and "the second" used in the present embodiment mean that the VMM device 13 runs two operating systems and the two operating systems provide network services respectively; however, in other embodiments, the VMM device 13 may further run more than two operating systems, with each of the operating systems also providing different network services respectively. In other words, when the VMM device 13 runs more than two operating systems, the present invention may also be adopted.

According to the above descriptions, in the present invention, the VMM device of the host acquires from the memory thereof information of a plurality of different operating systems running on the VMM device, and based on the information, filters a packet received by the host according to different operating systems or network services provided by the operating systems. Furthermore, based on the information, the security system running on the VMM device may also choose, from a large number of verification rules that are originally used, sets of verification rules that are respectively applicable to different operating systems or network services provided by the operating systems. Thus, depending on the operating system to which the packet corresponds, the packet can be verified by using only a chosen set of verification rules, thereby avoiding use of all the verification rules to verify the packet. Additionally, when the security system applies all the verification rules to verify a packet, use of such information may also prevent occurrence of a false determination when the packet is verified. Accordingly, the information security protection host of the present invention can effectively improve the detection performance and reduce occurrence of a false determination.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An information security protection host, comprising:
  a network interface, connecting to a computer network and being configured to receive a first packet and a second packet; and
  a virtual machine monitor (VMM) device, connecting to the network interface and being configured to run a first operating system, a second operating system and a security system, wherein the first operating system provides a first network service, the second operating system provides a second network service, the security system is configured to provide a plurality of verification rules and the VMM device is further configured to provide in real time a piece of first operating system information of the first operating system, a piece of first network service information of the first network service, a piece of second operating system information of the second operating system and a piece of second network service information of the second network service;
  wherein the first network service information comprises a first service port number, and when the first packet is received by the network interface via a port, the VMM device further, according to the first operating system information or the first network service information, determines that the first packet is associated with the first operating system and a port number of the port is unequal to the first service port number so as to filter out the first packet;
  wherein the second network service information comprises a second service port number, and when the second packet is received by the network interface via another port, the VMM device further, according to the second operating system information or the second network service information, determines that the second packet is associated with the second operating system and a port number of the another port is unequal to the second service port number so as to filter out the second packet;
  wherein the VMM device further provides the first operating system information and the first network service information to the security system in real time so that the security system chooses a first set of verification rules from the verification rules according to the first operating system information or the first network service information, and when the VMM device, according to the first operating system information or the first network service information, determines that the first packet is associated with the first operating system and the port number of the port is equal to the first service port number, the first set of verification rules is applied to verify the first packet; and wherein the VMM device further provides the second operating system information and the second network service information to the security system in real time so that the security system chooses a second set of verification rules from the verification rules according to the second operating system information or the second network service information, and when the VMM device, according to the second operating system information or the second network service information, determines that the second packet is associated with the second operating system and the sort number of the another port is equal to the second service sort number the second set of verification rules is applied to verify the second packet.

2. The information security protection host as claimed in claim 1, wherein the VMM device further comprises a memory, and when the VMM device runs the first operating system, the memory stores the first operating system information and the first network service information.

3. The information security protection host as claimed in claim 1, wherein the first operating system information is used to indicate that the first operating system is one of an Microsoft operating system and a Unix-like operating system.

4. The information security protection host as claimed in claim 1, wherein the first network service is selected from a group consisting of: a Web page service, a File Transfer Protocol (FTP) service and an email service.

5. The information security protection host as claimed in claim 1, wherein the VMM device further comprises a memory, and when the VMM device runs the second operating system, the memory stores the second operating system information and the second network service information.

6. The information security protection host as claimed in claim 1, wherein the second operating system information is used to indicate that the second operating system is one of an Microsoft operating system and a Unix-like operating system.

7. The information security protection host as claimed in claim 1, wherein the second network service is selected from a group consisting of: a Web page service, an FTP service and an email service.

8. An information security protection host, comprising:
a network interface, connecting to a computer network and being configured to receive a first packet and a second packet; and
a VMM device, connecting to the network interface and being configured to run a first operating system, a second operating system and a security system, wherein the first operating system provides a first network service, the second operating system provides a second network service, and the security system is configured to provide a plurality of verification rules;
wherein the VMM device further provides a piece of first operating system information of the first operating system and a piece of first network service information of the first network service to the security system in real time so that the security system, according to the first operating system information or the first network service information, chooses a first set of verification rules from the verification rules and determines that the first packet is associated with the first operating system so as to apply the first set of verification rules to verify the first packet;
wherein the VMM device is further configured to provide a piece of second operating system information of the second operating system and a piece of second network service information of the second network service to the security system in real time so that the security system, according to the second operating system information or the second network service information, chooses a second set of verification rules from the verification rules and determines that the second packet is associated with the second operating system so as to apply the second set of verification rules to verify the second packet.

9. The information security protection host as claimed in claim 8, wherein the VMM device further comprises a memory, and when the VMM device runs the first operating system, the memory stores the first operating system information and the first network service information.

10. The information security protection host as claimed in claim 8, wherein the first operating system information is used to indicate that the first operating system is one of an Microsoft operating system and a Unix-like operating system.

11. The information security protection host as claimed in claim 8, wherein each of the first network service and the second network service is selected from a group consisting of: a Web page service, an FTP service and an email service.

12. The information security protection host as claimed in claim 8, wherein the VMM device further comprises a memory, and when the VMM device runs the second operating system, the memory stores the second operating system information and the second network service information.

13. The information security protection host as claimed in claim 8, wherein the second operating system information is used to indicate that the second operating system is one of an Microsoft operating system and a Unix-like operating system.

14. An information security protection host, comprising:
a network interface, connecting to a computer network and being configured to receive a first packet and a second packet; and
a VMM device, connecting to the network interface and being configured to run a first operating system, a second operating system and a security system, wherein the first operating system provides a first network service, the second operating system provides a second network service, the security system is configured to provide a plurality of verification rules so as to verify the first packet and the second packet according to the verification rules, and the VMM device is further configured to provide in real time a piece of first operating system information of the first operating system, a piece of first network service information of the first network service, a piece of second operating system information of the second operating system and a piece of second network service information of the second network service;
wherein when the first packet fails to pass one of the verification rules, the VMM device further, according to the first operating system information or the first network service information, determines that the first packet is associated with the first operating system and the rule is not associated with the first operating system, so as to prevent occurrence of a false determination when the security system is used to verify the first packet according to the verification rules; and wherein when the second packet fails to pass one of the verification rules, the VMM device further, according to the second operating system information or the second network service information, determines that the second packet is associated with the second operating system and the rule is not associated with the second operating system, so as to prevent occurrence of a false determination when the security system is used to verify the second packet according to the verification rules.

15. The information security protection host as claimed in claim 14, wherein the VMM device further comprises a memory, and when the VMM device runs the first operating system, the memory stores the first operating system information and the first network service information.

16. The information security protection host as claimed in claim 14, wherein the first operating system information is used to indicate that the first operating system is one of an Microsoft operating system and a Unix-like operating system.

17. The information security protection host as claimed in claim 14, wherein the first network service is selected from a group consisting of: a Web page service, an FTP service and an email service.

18. The information security protection host as claimed in claim 14, wherein the VMM device further comprises a memory, and when the VMM device runs the second operating system, the memory stores the second operating system information and the second network service information.

19. The information security protection host as claimed in claim 14, wherein the second operating system information is used to indicate that the second operating system is one of an Microsoft operating system and a Unix-like operating system.

20. The information security protection host as claimed in claim 14, wherein the second network service is selected from a group consisting of: a Web page service, an FTP service and an email service.

* * * * *